United States Patent
Ueda et al.

(10) Patent No.: US 7,144,953 B2
(45) Date of Patent: *Dec. 5, 2006

(54) CURABLE RESIN COMPOSITION

(75) Inventors: Kazuhiko Ueda, Kobe (JP); Jun Kotani, Settsu (JP); Shintaro Komitsu, Takasago (JP); Hiroshi Iwakiri, Kobe (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/492,848
(22) PCT Filed: Oct. 23, 2002
(86) PCT No.: PCT/JP02/10977

§ 371 (c)(1),
(2), (4) Date: Apr. 16, 2004

(87) PCT Pub. No.: WO03/035755

PCT Pub. Date: May 1, 2003

(65) Prior Publication Data

US 2005/0004327 A1  Jan. 6, 2005

(30) Foreign Application Priority Data

Oct. 23, 2001  (JP) ............................. 2001-324676

(51) Int. Cl.
*C08L 83/06* (2006.01)
(52) U.S. Cl. .................................................. 525/100
(58) Field of Classification Search ................ 525/105, 525/100
See application file for complete search history.

(56) References Cited

U.S. PATENT DOCUMENTS

| | | | |
|---|---|---|---|
| 5,109,064 A | | 4/1992 | Wakabayashi et al. |
| 5,650,467 A | * | 7/1997 | Suzuki et al. ................ 525/100 |
| 6,350,345 B1 | * | 2/2002 | Kotani et al. ................ 156/329 |
| 6,642,309 B1 | * | 11/2003 | Komitsu et al. ............. 525/100 |
| 6,831,130 B1 | * | 12/2004 | Fujita et al. ................. 525/101 |

FOREIGN PATENT DOCUMENTS

| | | |
|---|---|---|
| EP | 673972 A | 9/1995 |
| JP | 04-372683 A | 12/1992 |
| JP | 06-172631 A | 6/1994 |
| JP | 11-335647 A | 12/1999 |
| JP | 2000-136313 A | 5/2000 |
| JP | 2001-049113 A | 2/2001 |
| JP | 2002-201350 A | 7/2002 |

* cited by examiner

*Primary Examiner*—Margaret G. Moore
(74) *Attorney, Agent, or Firm*—Sughrue Mion, PLLC

(57) ABSTRACT

The present invention provides a composition, which is easy to produce because of high ease of handling the starting materials. The composition exhibits excellent transparency, and a product prepared using the composition exhibits excellent mechanical properties and adhesive properties.

The curable resin composition contains (A) an oxyalkylene polymer having silicon-containing functional groups crosslinkable through formation of siloxane bonds; (B) a copolymer having silicon-containing functional groups crosslinkable through formation of siloxane bonds, the molecular chain of the copolymer consisting substantially of (b-1) an alkyl (meth)acrylate monomeric unit having $C_1$–$C_2$ alkyl and (b-2) an alkyl (meth)acrylate monomeric unit having $C_7$–$C_9$ alkyl; and (C) a curing agent.

4 Claims, No Drawings

CURABLE RESIN COMPOSITION

This is a National Stage of International Application No. PCT/JP02/10977 filed Oct. 23, 2002, claiming priority to Japanese Application No. 200 1-324676 filed on Oct. 23, 2001.

TECHNICAL FIELD

The present invention relates to a curable composition containing at least two curable polymers. In particular, it relates to a curable composition containing a crosslinkable alkyl (meth)acrylate polymer and a crosslinkable oxyalkylene polymer. In the present invention, the term "alkyl (meth)acrylate" refers to "alkyl acrylate and/or alkyl methacrylate".

BACKGROUND ART

A curable composition containing an oxyalkylene polymer having silicon-containing functional groups crosslinkable through the formation of siloxane bonds (hereinafter, simply referred to as "reactive silicon groups") and, optionally, an alkyl (meth)acrylate polymer containing reactive silicon groups is disclosed in, for example, Japanese Unexamined Patent Application Publication Nos. 59-122541, 60-31556, 63-112642, and 6-172631.

Among these publications, Japanese Unexamined Patent Application Publication No. 63-112642 discloses a composition containing a copolymer containing long-chain alkyl (meth)acrylate. This composition has various practical characteristics, such as transparency and tensile properties, superior to those of other compositions disclosed in the other publications described above. However, long-chain alkyl (meth)acrylate monomers, i.e., the starting material of the copolymer containing long-chain alkyl (meth)acrylate, are generally expensive and are difficult to handle since long-chain alkyl (meth)acrylate monomers are solid at room temperature. Moreover, in a typical process used to synthesize a copolymer containing alkyl (meth)acrylate monomeric units by polymerization, the monomeric unit must be cooled in advance for the safety reasons. Long-chain alkyl (meth)acrylate monomers tend to precipitate when mixed with other monomeric units cooled in advance, which is a problem. In general, alkyl (meth)acrylate polymers exhibit a higher glass transition temperature, larger cohesive force, and higher viscosity than those of oxyalkylene polymers. Thus, the viscosity of a composition containing an oxyalkylene polymer and an alkyl (meth)acrylate polymer increases, which is problem from a practical viewpoint.

SUMMARY OF THE INVENTION

An object of the present invention is to provide a curable resin composition, which is easy to produce since starting materials therefor are easy to handle. The curable resin composition exhibits excellent transparency, and a product prepared from the curable resin composition exhibits excellent mechanical properties and adhesive properties.

The Inventors have made the present invention based on the finding that the above-described object can be achieved by using a copolymer containing an alkyl (meth)acrylate monomeric unit having $C_1$–$C_2$ alkyl and an alkyl (meth)acrylate monomeric unit having $C_7$–$C_9$ alkyl in preparing a curable resin composition containing an oxyalkylene polymer having silicon-containing functional groups crosslinkable through formation of siloxane bonds, a copolymer having silicon-containing functional groups crosslinkable through formation of siloxane bonds, and a curing agent.

In particular, the present invention provides a curable resin composition including (A) an oxyalkylene polymer having silicon-containing functional groups crosslinkable through formation of siloxane bonds; (B) a copolymer having silicon-containing functional groups crosslinkable through formation of siloxane bonds, the molecular chain of the copolymer consisting substantially of (b-1) an alkyl (meth)acrylate monomeric unit having $C_1$–$C_2$ alkyl and (b-2) an alkyl (meth)acrylate monomeric unit having $C_7$–$C_9$ alkyl; and (C) a curing agent.

In a preferred embodiment, the molecular chain of the polymer (A) is substantially constituted from a repeating unit represented by general formula (1):

$$-CH(CH_3)CH_2-O- \qquad (1)$$

In a more preferred embodiment, the number-average molecular weight of the polymer (A) of the curable resin composition is at least 6,000 and Mw/Mn is 1.6 or less.

In a most preferred embodiment, the main chain of the polymer (A) of the curable resin composition is synthesized by polymerizing alkylene oxide in the presence of an initiator and at least one catalyst selected from the group consisting of a cyanide complex of compound metal, a cesium compound, and a compound containing a P=N bond.

DETAILED DESCRIPTION OF THE INVENTION

The present invention will now be described in detail.

Reactive silicon groups contained in the oxyalkylene polymer of a component A of the present invention are not particularly limited. Representative examples thereof include those represented by general formula (2) below:

$$-(-Si(R^1{}_{2-b})X_b-O-)_m-Si(R^2{}_{3-a})X_a \qquad (2)$$

(wherein $R^1$ and $R^2$ each represent a $C_1$–$C_{20}$ alkyl group, a $C_6$–$C_{20}$ aryl group, a $C_7$–$C_{20}$ aralkyl group, or a triorganosiloxy group represented by $(R')_3SiO-$; when two or more $R^1$s or $R^2$s exist, they may be the same or different; R' represents a monovalent $C_1$–$C_{20}$ hydrocarbon group; the three R's may be the same or different; X represents a hydroxy group or a hydrolyzable group; when two or more Xs exist, they may be the same or different; a represents 0, 1, 2, or 3; and b represents 0, 1, or 2. Among the number m of the repeating units represented by general formula (3) in the formula, the value of b may be the same or different:

$$-Si(R^1{}_{2-b})X_b-O- \qquad (3)$$

wherein m represents an integer in the range of 0 to 19; and $a+\Sigma b \geq 1$.)

The hydrolyzable group represented by X is not particularly limited. Any known hydrolyzable group can be suitably used. Examples of the hydrolyzable group include a hydrogen atom, a halogen atom, an alkoxyl group, an acyloxy group, a ketoximate group, an amino group, an amide group, an acid amide group, an aminooxy group, a mercapto group, and alkenyloxy group. Among these, a hydrogen atom, an alkoxyl group, an acyloxy group, a ketoximate group, an amino group, an amide group, an aminooxy group, a mercapto group and an alkenyloxy group are preferred for their influence to environment and ready availability of starting materials. In particular, an alkoxyl group such as a methoxy group is preferred due to its moderate hydrolyzability and ease of handling.

One to three hydrolyzable groups or hydroxyl groups can bond with one silicon atom. Preferably, (a+Σb) is in the range of 1 to 5. When two or more hydrolyzable groups or hydroxyl groups exist in the reactive silicon group, they may be the same or different. The number of silicon atoms in the reactive silicon group may one or more. When the reactive silicon group has its silicon atoms linked through siloxane bonding, about twenty silicon atoms may be contained in the group. The type of reactive silicon group is not particularly limited but is preferably selected from a dimethylmonomethoxysilyl group, a methyldimethoxysilyl group, a trimethoxysilyl group, an ethyldiethoxysilyl group, a triethoxysilyl group, a methyldiisopropenyloxysilyl group, and a triisopropenyloxysilyl group due to their high hydrolysis activity, moderate hydrolyzability, and ease of handling. Two or more of these groups may be included.

One polyalkylene polymer molecule preferably contains at least one, and more preferably 1.1 to 5 reactive silicon groups. When the number of reactive silicon groups is less than one per molecule, neither sufficient curability nor sufficient rubber elasticity can be obtained. When the number of reactive silicon groups is more than five, an excessively hard product will result. The reactive silicon group may exist at an end of or within the oxyalkylene polymer molecular chain. Reactive silicon groups preferably exist at the ends since the effective crosslinking density of the oxyalkylene polymer component contained in the resulting cured product increases and the product can exhibit high strength, high extensibility, and low elastic modulus as a result.

Nonlimiting examples of the oxyalkylene polymer, i.e., the component A of the present invention, include polyoxyethylene, polyoxypropylene, polyoxybutylene, polyoxyisobutylene, and polyoxytetramethylene. The molecular chain of the oxyalkylene polymer A may consist of one type of repeating unit or two or more types of repeating units. The oxyalkylene polymer may be straight or branched, or both straight and branched. Among these oxyalkylene polymers, those having a molecular chain consisting substantially of a repeating unit represented by general formula (1) are particularly preferred since the curable composition prepared therefrom can be easily handled and a cured product prepared from the curable composition exhibits satisfactory physical properties:

$$-CH(CH_3)CH_2-O- \tag{1}$$

Here, the term "substantially" means that the polymer may contain other monomers but the repeating unit represented by formula (1) above should be contained in an amount of at least 50 percent by weight and preferably at least 80 percent by weight of the total of the monomeric units of the polymer A.

The polystyrene-equivalent number-average molecular weight (Mn) of the oxyalkylene polymer determined by gel permeation chromatography (GPC) is preferably 6,000 to 60,000 and more preferably 8,000 to 50,000 to achieve sufficient curability and ease of handling. Most preferably, Mn is 10,000 to 30,000 to further achieve superior mechanical properties. The ratio of the weight-average molecular weight to the number-average molecular weight (Mw/Mn) in terms of polystyrene equivalent by GPC is preferably 1.6 or less, more preferably 1.5 or less, and most preferably 1.4 or less to yield a narrow molecular weight distribution (smaller Mw/Mn). When mixed with a reactive-silicon-containing alkyl (meth)acrylate copolymer B, an oxyalkylene polymer A having such a narrow molecular distribution can produce a low-viscosity composition that can be worked easily compared to when an oxyalkylene polymer having a broad molecular weight distribution is used.

The reactive-silicon-group-containing oxyalkylene polymer, i.e., the component A, of the present invention can be prepared by, for example, introducing reactive silicon groups into an oxyalkylene polymer having functional groups.

A known method may be employed to introduce reactive silicon groups. Examples of such methods are as follows:

(1) An oxyalkylene polymer having functional groups, such as hydroxy groups, at the ends is reacted with an organic compound having unsaturated groups and active groups reactive to these functional groups, and the resulting reaction product is hydrosilylated using hydrosilane having hydrolyzable groups; and (2) An oxyalkylene polymer having functional groups Y, such as hydroxyl groups, epoxy groups, and isocyanate groups, at the ends is reacted with a compound having a functional group Y' reactive to the functional groups Y and a reactive-silicon-group-containing compound. Nonlimiting examples of the silicon compound having the functional group Y' include amino-group-containing silanes such as γ-(2-aminoethyl)aminopropyltrimethoxysilane, γ-(2-aminoethyl)aminopropylmethyldimethoxysilane, and γ-aminopropyltriethoxysilane; mercapto-group-containing silanes such as γ-mercaptopropyltrimethoxysilane and γ-mercaptopropylmethyldimethoxysilane; epoxysilanes such as γ-glycidoxypropyltrimethoxysilane, and β-(3,4-epoxycyclohexyl)ethyltrimethoxysilane; vinyl-unsaturated-group-containing silane groups such as vinyltriethoxysilane, γ-methacryloyloxypropyltrimethoxysilane, and γ-acryloyloxypropylmethyldimethoxysilane; chlorine-containing silanes such as γ-chloropropyltrimethoxysilane; isocyanate-containing silanes such as γ-isocyanatepropyltriethoxysilane and γ-isocyanatepropylmethyldimethoxysilane; and hydrosilanes such as methyldimethoxysilane, trimethoxysilane, and methyldiethoxysilane.

Among the methods described above, method (1) and method (2) with a hydroxy-terminated polymer reacted with a compound containing an isocyanate group or a reactive silicon group are particularly preferred due to ease of obtaining the starting materials and carrying out the reaction.

Introduction of reactive silicon groups results in widening of the molecular weight distribution from that of the polymer before the introduction. Accordingly, the molecular weight distribution of the polymer before the introduction is preferably as narrow as possible.

The oxyalkylene polymer having a high molecular weight and a narrow molecular weight distribution can be synthesized by, for example, the methods disclosed in Japanese Unexamined Patent Application Publication Nos. 61-197631, 61-215622, 61-215623, 61-218632, 50-149797, 61-197631, 2-276821, 10-273512, 10-36499, 11-106500, and 11-302371 and in Japanese Examined Patent Application Publication Nos. 46-27250, and 59-15336.

The oxyalkylene polymer is preferably prepared by polymerizing alkylene oxide catalyzed by at least one compound selected from the group consisting of a cyanide complex of compound metal, a cesium compound, and a compound containing a P=N bond in the presence of an initiator. In this manner, a polymer having a narrow molecular weight distribution can be easily obtained.

Examples of the initiator include dihydric alcohol and polyalcohol such as ethylene glycol, propylene glycol, butanediol, hexamethylene glycol, methallyl alcohol, hydrogenated bisphenol A, neopentyl glycol, polybutadiene diol, diethylene glycol, triethylene glycol, polyethylene glycol, dipropylene glycol, glycerin, trimethylolmethane, trimethylolpropane, and pentaerythritol; and various oligomers containing hydroxy groups. Among these examples, polypropylene glycol, polypropylene triol, and polypropylene tetraol are particularly preferred due to their economical advantages and handling ease.

The cyanide complex of compound metal used in the present invention is preferably a complex mainly containing zinc hexacyanocobaltate from the standpoint of polymerization activity. More preferably, the cyanide complex is an ether and/or alcohol complex from the standpoint of polymerization control. In order to obtain a polymer with a narrower molecular weight distribution, the ether is preferably ethylene glycol dimethyl ether (glyme) or diethylene glycol dimethyl ether (diglyme), and the alcohol is preferably t-butanol.

The amount of the cyanide complex of compound metal is preferably 0.0001 to 0.03 percent by weight of the final polyoxyalkylene compound. The amount is more preferably 0.001 to 0.01 percent by weight from the standpoint of reactivity. At an amount less than 0.0001 percent by weight, the reaction rate is not sufficiently high. At an amount exceeding 0.03 percent by weight, the cost of making the polyoxyalkylene compound increases.

The cesium compound of the present invention preferably contains one of the following as the primary material from the standpoint of reactivity: cesium metal; cesium alkoxide such as cesium methoxide, cesium ethoxide, and cesium propoxide; cesium hydroxide; and cesium carbonate. Cesium hydroxide is particularly preferred due to its ready availability and economical advantages.

The amount of the cesium compound in terms of cesium metal is preferably 0.05 to 1.5 percent by weight of the final polyoxyalkylene compound. The amount is preferably 0.1 to 1.0 percent by weight from the standpoint of reactivity. At an amount less than 0.05 percent by weight, a sufficient reaction rate cannot be achieved. At an amount exceeding 1.5 percent by weight, the cost of manufacturing the polyoxyalkylene compound increases.

In the present invention, the compound containing the P=N bond is preferably at least one compound selected from the group consisting of a phosphazenium compound, a phosphine oxide compound, and a phosphazene compound.

Examples of the phosphazenium compound are disclosed in Japanese Unexamined Patent Application Publication No. 11-106500. In particular, the examples include tetraquis[tris(dimethylamino)phosphoranylideneamino]phosphonium hydryoxide, tetraquis[tris(dimethylamino)phosphoranylideneamino]phosphonium methoxide, tetraquis[tris(dimethylamino)phosphoranylideneamino]phosphonium ethoxide, and tetraquis[tri(pyrrolidin-1-yl)]phosphoranylideneamino]phosphonium tert-butoxide.

Examples of the phosphazene compound are disclosed in Japanese Unexamined Patent Application Publication No. 10-36499. In particular, the examples include 1-tert-butyl-2,2,2-tris(dimethylamino)phosphazene, 1-(1,1,3,3-tetramethylbutyl)-2,2,2-tris (dimethylamino)phosphazene, 1-ethyl-2,2,4,4,4-pentaquis(dimethylamino)-2λ5,4λ5-catenadi(phosphazene), 1-tert-butyl-4,4,4-tris(dimethylamino)-2,2-bis[tris (dimethylamino) phosphoranylideneamino]-2λ5,4λ5-catenadi(phosphazene), 1-(1,1,3,3-tetramethylbutyl)-4,4,4-tris(dimethylamino)-2,2-bis[tris (dimethylamino)phosphoranylideneamino]-2λ5,4λ5-catenadi(phosphazene), 1-tert-butyl-2,2,2-tri(1-pyrrolidinyl)phosphazene, and 7-ethyl-5,11-dimethyl-1,5,7,11-tetraaza-6λ5-phosphaspiro[5,5]undeca-1(6)-en.

Examples of the phosphine oxide compound are disclosed in Japanese Unexamined Patent Application Publication No. 11-302371. In particular, the examples include tris[tris(dimethylamino)phosphoranylideneamino]phosphine oxide, and tris[tris(diethylamino)phosphoranylideneamino]phosphine oxide.

Among these compounds, the phosphazenium compound and the phosphine oxide compound are particularly preferred from the standpoint of industrial use.

The amount of the P=N bond-containing compound is preferably $1 \times 10^{-4}$ to $5 \times 10^{-1}$ mole per mole of active hydrogen compound in the initiator. At an amount less than $1 \times 10^{-4}$ mole, the reaction rate is not sufficiently high. At an amount exceeding $5 \times 10^{-1}$ mole, the cost of manufacturing the polyoxyalkylene compound increases.

The (meth)acrylate monomeric unit having $C_1$–$C_2$ alkyl, which is a component b-1 of the component B, which is the reactive-silicon-containing alkyl (meth)acrylate copolymer (hereinafter simply referred to as "the copolymer B"), is represented by general formula (4):

$$CH_2=C(R^3)COOR^4 \qquad (4)$$

wherein $R^3$ represents a hydrogen atom or a methyl group and $R^4$ represents a $C_1$–$C_2$ alkyl group. Examples of $R^4$ include a methyl group and an ethyl group. When the (meth)acrylate monomeric unit having $C_1$–$C_2$ alkyl is used as the component b-1, a product exhibiting high bond strength and superior rubber elasticity can be prepared from the curable resin composition of the present invention. The monomers represented by general formula (4) may be used alone or in combination.

The (meth)acrylate monomeric unit having $C_7$–$C_9$ alkyl, which is a component b-2, is represented by general formula (5):

$$CH_2=C(R^5)COOR^6 \qquad (5)$$

wherein $R^5$ represents a hydrogen atom or a methyl group and $R^6$ represents a $C_7$–$C_9$ alkyl group. Examples of $R^6$ include alkyl groups such as n-heptyl, isoheptyl, n-octyl, 2-ethylhexyl, isooctyl, n-nonyl, and isononyl. In particular, a 2-ethylhexyl group is preferred from the standpoint of economy and availability of the starting materials. The monomers represented by general formula (5) may be used alone or in combination.

When the (meth)acrylate monomeric unit having $C_7$–$C_9$ alkyl is used as the component b-2, a composition having transparency comparable to that of a conventional composition can be prepared with higher ease of handling the monomeric units. Moreover, the cured product prepared from the composition of the present invention has rubber elasticity and bond strength superior to conventional compositions.

The molecular chain of the copolymer B consists substantially of the component b-1 and the component b-2, which are monomeric units. Here, the term "substantially" means that the total content of the components b-1 and b-2 exceeds 50 percent by weight and more preferably 70 percent by weight of the total amount of the copolymer B.

The weight ratio of the amount of the component b-1 to the total of the b-1 and b-2 components is preferably 95 percent by weight or less to improve ease of handling the curable resin composition of the present invention and more preferably 85 percent by weight or less to improve the bond strength. From the same standpoint, the ratio is preferably at least 40 percent by weight and more preferably at least 50 percent by weight. When the ratio of the component b-1 exceeds 95 percent by weight, the resulting curable composition may become excessively viscous, thus complicating handling. When the ratio of the component b-1 is less than 40 percent by weight, the adhesiveness to various substrate materials may be degraded.

The copolymer B may contain other monomeric units in addition to the components b-1 and b-2. Examples of such monomeric units include monomers having carboxylic groups such as acrylic acid and methacrylic acid; monomers having amide groups such as acrylamide, methacrylamide, N-methylolacrylamide, and N-methylolmethacrylamide; monomers having epoxy groups such as glycidyl acrylate and glycidyl methacrylate; monomers having amino groups such as diethylaminoethyl acrylate, diethylaminoethyl methacrylate, and aminoethyl vinyl ether; and other monomeric units based on acrylonitrile, styrene, α-methylstyrene, alkylvinylether, vinyl chloride, vinyl acetate, vinyl propionate, and ethylene.

The polystyrene-equivalent number-average molecular weight of the copolymer B is preferably 500 to 100,000, more preferably 7,000 to 10,000, and most preferably 1,000 to 5,000 by GPC to simplify handling. When the number-average molecular weight of the copolymer B is less than 500, the resulting product cannot exhibit sufficient rubber elasticity. When the number-average molecular weight of the copolymer B is more than 100,000, the viscosity excessively increases, and handling becomes more difficult.

The reactive silicon groups in the copolymer B are the same as those in the oxyalkylene polymer A in the present invention and are crosslinkable at room temperature. Typical examples of the reactive silicon group are represented by general formula (6):

$$-Si(R^2_{3-a})X_a \quad (6)$$

wherein $R^2$, X, and a are the same as above.

Specific examples of the reactive silicon groups in the copolymer B from the standpoint of economy and ease of handling include a dimethylmonomethoxysilyl group, a methyldimethoxysilyl group, a trimethoxysilyl group, an ethyldiethoxysilyl group, a triethoxysilyl group, a methyldiisopropenyloxysilyl group, and a triisopropenyloxysilyl group. The reactive silicon groups of the copolymer B are preferably at least one selected from these.

The average number of the reactive silicon group per molecule of the copolymer B is at least 1, preferably at least 1.1, and more preferably at least 1.5 to obtain sufficient curability. The apparent number-average molecular weight per reactive silicon group is preferably 300 to 4,000.

The copolymer B of the present invention is synthesized through vinyl polymerization of the monomers b-1 and b-2. Examples of the vinyl polymerization include radical vinyl polymerization, e.g., typical solution polymerization and mass polymerization. The monomers, a radical initiator (optional), and a chain transfer agent (optional) for adjusting the molecular weight, such as n-dodecylmercaptan or t-dodecylmercaptan, may be polymerized at a reaction temperature of 50 to 150° C. A solvent may be used if required. If a solvent is required, the solvent is preferably a nonreactive solvent such as ether, hydrocarbon, acetic acid ester, or alcohol since such a solvent is inexpensive and yields a safe polymerization reaction. From the environmental viewpoint, the solvent is preferably nonaromatic. Preferably, the non-aromatic solvent is an alcohol such as butanol from the environmental viewpoint and ease of handling the resulting polymer.

Various methods for introducing reactive silicon groups into the copolymer B are available. Nonlimiting examples of the methods are as follows: (I) a polymerization method including adding a compound, e.g., $CH_2=CHSi(OCH_3)_3$, having polymerizable unsaturated bonds and reactive silicon groups to the monomers b-1 and b-2; a method including adding a compound (such as acrylic acid) having polymerizable unsaturated bonds and reactive silicon groups (hereinafter simply referred to as "Z groups") to the monomers b-1 and b-2 to carry out copolymerization, and allowing the resulting copolymer to react with a compound having functional groups (hereinafter "Z' groups") reactive with the Z groups, e.g., a compound having isocyanate groups and $-Si(OCH_3)_3$ groups; (III) a method for copolymerizing the monomers b-1 and b-2 in the presence of reactive-silicon-group-containing mercaptan functioning as a chain transfer agent; (IV) a method for copolymerizing the monomers b-1 and b-2 using a reactive-silicon-group-containing azobisnitrile compound or a disulfide compound as the initiator; and (V) a method including copolymerizing the monomers b-1 and b-2 via a living radical polymerization and introducing reactive silicon groups at the ends of the molecular chain. The methods of (I) to (V) may be employed alone or in combination. For example, the methods of (I) and (III) may be combined to copolymerize the monomers b-1 and b-2 with the compound having polymerizable unsaturated bonds and reactive silicon groups in the presence of the reactive-silicon-group-containing mercaptan functioning as the chain transfer agent.

Specific examples of the compound used in method (I) include $CH_2=CHSi(CH_3)(OCH_3)_2$, $CH_2=CHSi(CH_3)Cl_2$, $CH_2=CHSi(OCH_3)_3$, $CH_2=CHSiCl_3$, $CH_2=CHCOO(CH_2)_2Si(CH_3)(OCH_3)_2$, $CH_2=CHCOO(CH_2)_2Si(OCH_3)_3$, $CH_2=CHCOO(CH_2)_2Si(CH_3)Cl_2$, $CH_2=CHCOO(CH_2)_2SiCl_3$, $CH_2=C(CH_3)COO(CH_2)_2Si(CH_3)(OCH_3)_2$, $CH_2=C(CH_3)COO(CH_2)_2Si(OCH_3)_3$, $CH_2=C(CH_3)COO(CH_2)_3Si(CH_3)(OCH_3)_2$, $CH_2=C(CH_3)COO(CH_2)_3Si(OCH_3)_3$, $CH_2=C(CH_3)COO(CH_2)_2Si(CH_3)Cl_2$, $CH_2=C(CH_3)COO(CH_2)_2SiCl_3$, $CH_2=CHCH_2OC(O)$-Ph-COO$(CH_2)_3Si(CH_3)(OCH_3)_2$, $CH_2=CHCH_2OC(O)$-Ph-COO$(CH_2)_3Si(OCH_3)_3$, $CH_2=CHCH_2OC(O)$-Ph-COO$(CH_2)_3Si(CH_3)Cl_2$, and $CH_2=CHCH_2OC(O)$-Ph-COO$(CH_2)_3SiCl_3$, wherein Ph represents paraphenylene. Among these compounds, $CH_2=CHSi(OCH_3)_3$, $CH_2=C(CH_3)COO(CH_2)_3Si(CH_3)(OCH_3)_2$, and $CH_2=C(CH_3)COO(CH_2)_3Si(OCH_3)_3$ are particularly preferred from the standpoint of economy and the reactivity of the resulting curable composition.

These silane compounds can be synthesized by various methods. For example, they can be prepared by reacting acetylene, allyl acrylate, allyl methacrylate, diallyl phthalate, or the like with methyldimethoxysilane, methyldichlorsilane or the like in the presence of a Group-VIII transition metal catalyst. For example, a Group-VIII transition metal complex compound containing one selected from the group consisting of platinum, rhodium, cobalt, palladium, and nickel may be effectively used as the catalyst. In particular, platinum compounds such as platinum black, chloroplatinic acid, a platinum-alcohol compound, a platinum-olefin complex, a platinum-aldehyde complex, and a platinum-ketone complex are preferred.

Regarding the compound used in method (II), various combinations of the Z group and the Z' group are possible. For example, the Z group can be vinyl and the Z' group can be hydrosilicon (H—Si). The Z groups may bond with the Z' groups through hydrosilylation. Examples of the compound having polymerizable unsaturated bonds and vinyl groups as the Z groups include allyl acrylate and allyl methacrylate. Nonlimiting examples of the hydrosilane compound containing a hydrosilicon group as the Z' group and a reactive silicon group include alkoxysilanes such as trimethoxysilane, triethoxysilane, methyldiethoxysilane, methyldimethoxysilane, dimethylmethoxysilane, and phenyldimethoxysilane; acyloxysilanes such as methyldiacetoxysilane and trimethylsiloxymethylacetoxysilane; ketoximatesilanes such as bis(dimethylketoximate)methylsilane, bis(cyclohexylketoximate)methylsilane, and bis(diethylketoximate)trimethylsiloxysilane; hydrosilanes such as dimethylsilane, trimethylsiloxymethylsilane, and 1,1-dimethyl-2,2-dimethyldisiloxane; and alkenyloxysilanes such as methyltri(isopropenyloxy)silane and dimethyltri(isopropenyloxy)silane.

Examples of the reactive-silicon-group-containing mercaptan used as the chain transfer agent of method (III) include γ-mercaptopropyltrimethoxysilane, γ-mercaptopropylmethyldimethoxysilane, and γ-mercaptopropyltriethoxysilane. As is disclosed in Japanese Unexamined Patent Application Publication No. 59-78222, a method of copolymerizing the monomers b-1 and b-2 in the presence of a bifunctional radical-polymerizable compound and a chain transfer agent, i.e., alkoxysilyl-containing mercaptan, may be employed.

Examples of the reactive-silicon-group-containing azobisnitrile compound or disulfide compound as the initiator used in method (IV) include an alkoxysilyl-containing azobisnitrile compound and an alkoxysilyl-containing disulfide compound disclosed in Japanese Unexamined Patent Application Publication Nos. 60-23405 and 62-70405 and the like.

An example method (V) is disclosed in Japanese Unexamined Patent Application Publication No. 09-272714.

In addition, a method in which a radical polymerization initiator having reactive silicon groups is used in combination with the reactive-silicon-group-containing mercaptan as disclosed in, for example, Japanese Unexamined Patent Application Publication Nos. 59-168014 and 60-228516 may also be employed.

Preferably, the curable composition of the present invention contains 5 to 5,000 and more preferably 5 to 2,000 parts by weight (hereinafter, simply referred to as "parts") of the copolymer B per 100 parts of the oxyalkylene polymer A so that both the polymer A and the copolymer B can sufficiently improve the characteristics. The ratio of the copolymer B to the polymer A is generally selected according to the intended usage and performance.

A curing agent used as a component C of the present invention may be any suitable one. Examples of a tin-based catalyst for use as the curing agent include bivalent tin carboxylates such as tin octylate, tin oleate, and tin stearate; dibutyltin dicarboxylates such as dibutyltin dilaurate and dibutyltin bis(alkylmaleate); alkoxide derivatives of dialkyltin such as dibutyltin dimethoxide and dibutyltin diphenoxide; intramolecular ligation derivatives such as dibutyltin diacetylacetonato and dibutyltin acetoacetate; and derivatives of quadrivalent dialkyltin oxide such as a reaction mixture of dibutyltin oxide and an ester compound, a reaction mixture of dibutyltin oxide and a silicate compound, and oxy derivatives of these dialkyltin oxide derivatives. Examples of a non-tin catalyst for use as the curing agent include metal carboxylates such as calcium carboxylate, zirconium carboxylate, iron carboxylate, vanadium carboxylate, bismuth carboxylate, lead carboxylate, titanium carboxylate, and nickel carboxylate, each of which contains octyl acid, oleic acid, naphthenic acid, stearic acid, or the like as the carboxylate component; titanium alkoxides such as tetraisopropyl titanate, tetrabutyl titanate, tetramethyl titanate, and tetra(2-ethylhexyltitanate); aluminum alkoxides such as aluminum isopropylate, mono-sec-butoxy aluminum diisopropylate, and aluminum-sec-butyrate; zirconium alkoxides such as zirconium n-propoxide and zirconium n-butylate; titanium chelates such as titanium tetraacetylacetonate, titanium ethylacetoacetate, octylene glycolate, and titanium lactate; aluminum chelates such as aluminum trisacetylacetonate, aluminum trisethylacetoacetate, and diisopropoxy aluminum ethylacetoacetate; zirconium chelates such as zirconium tetraacetylacetonato, zirconium monoacetylacetonato, zirconium bisacetylacetonato, zirconium acetylacetonato bisethylacetoacetate, and zirconium acetate; and basic compounds such as amines, amine salts, quaternary ammonium salts, and quanidine compounds.

Among these, the tin-based catalysts are preferred in view of the reactivity of the curable composition. In particular, the following catalysts are preferred from the standpoint of economy and reaction controllability: dibutyltin dicarboxylates such as dibutyltin dilaurate and dibutyltin bis(alkylmaleate); alkoxide derivatives of dialkyltin such as dibutyltin dimethoxide and dibutyltin diphenoxide; intramolecular ligation derivatives such as dibutyltin diacetylacetonato and dibutyltin acetoacetate; and derivatives of quadrivalent dialkyltin oxide such as a reaction mixture of dibutyltin oxide and an ester compound, a reaction mixture of dibutyltin oxide and a silicate compound, and oxy derivatives of these dialkyltin oxide derivatives. The curing agent is normally selected according to the intended usage and target performance.

The amount of the curing agent is preferably 0.1 to 10 parts per a total of 100 parts of the reactive-silicon-group-containing oxyalkylene polymer A and the reactive-silicon-containing alkyl (meth)acrylate copolymer B. When the amount of the curing agent is less than 0.1 part, the cure rate may become low and insufficient curing may result. At an amount exceeding 10 parts, heat or bubbles would be locally generated during curing, thereby producing a cured product with low quality.

In using the curable resin composition of the present invention, a filler may be added if required. Examples of the filler include reinforcing fillers such as fumed silica, precipitated silica, silicic anhydride, hydrous silica, and carbon black; fillers such as calcium carbonate, magnesium carbonate, diatomite, calcined clay, clay, talk, titanium oxide, bentonite, organic bentonite, ferric oxide, zinc oxide, active zinc oxide, hydrogenated caster oil, and Shirasu balloon; and fibrous fillers such as asbestos, glass fibers, and filaments. When a high-strength cured product is desired, 1 to 100 parts of a filler selected from fumed silica, precipitated silica, silicic anhydride, hydrous silica, carbon black, surface-treated fine calcium carbonate, calcined clay, clay, and active zinc oxide is preferably used relative to a total of 100 parts of the reactive-silicon-group-containing oxyalkylene polymer A and the reactive-silicon-containing alkyl (meth)acrylate copolymer B. When a low-strength high-extensibility product is desired, 5 to 200 parts of a filler selected from titanium oxide, calcium carbonate, magnesium carbonate, talk, ferric oxide, zinc oxide, and Shirasu balloon is preferably used relative to a total of 100 parts of the reactive-silicon-group-containing oxyalkylene polymer A and the reactive-silicon-containing alkyl (meth)acrylate copolymer B. These fillers can be used alone or in combination.

The curable resin composition of the present invention preferably contains both a plasticizer and a filler since the extensibility of the hardened product can be increased and a large amount of filler can be used. Examples of the plasticizer include phthalic esters such as dioctyl phthalate, dibutyl phthalate, and butylbenzyl phthalate; acryl polymer plasticizers such as a (meth)acryl polymer having a molecular weight distribution (Mw/Mn) of 1.8 or less prepared by living radical polymerization disclosed in Japanese Unexamined Patent Application Publication No. 2000-178456 and the like, and a SGO polymer manufactured by Toagosei Co., Ltd., set forth in Kogyo Zairyo (Engineering Materials) August 1998, p. 110; aliphatic dibasic acid esters such as dioctyl adipate, isodecyl succinate, and dibutyl sebacate; glycol esters such as diethylene glycol dibenzoate and pentaerythritol ester; aliphatic esters such as butyl oleate and methyl acetylricinolate; phosphate esters such as tricresyl phosphate, trioctyl phosphate, and octyldiphenyl phosphate; epoxy plasticizers such as epoxidized soybean oil, epoxidized linseed oil, and benzyl epoxystearate; polyester plasticizers such as polyesters of dibasic acid and dihydric alcohol; polyethers such as polypropylene glycol and derivatives thereof; polystyrenes such as poly-α-methylstyrene and polystyrene; polybutadiene, butadiene-acrylonitrile copolymers, polychloroprene, polyisoprene, polybutene, and chlorinated paraffins. These plasticizers can be used alone or in combination. Preferably, 0 to 100 parts of plasticizers is used relative to a total of 100 parts of reactive-silicon-group-containing oxyalkylene polymer A and the reactive-silicon-containing alkyl (meth)acrylate copolymer B.

If necessary, various additives, such as a dehydrating agent, a tackifier, an adhesion improving agent, an agent for adjusting physical characteristics, a storage capacity improver, an antioxidant, a UV absorber, a metal deactivator, an antiozonant, a light stabilizer, an amine radical crosslinking inhibiter, a decomposer for phosphorus peroxides, a slip additive, a pigment and a foaming agent, may be added to the composition. The method for producing the curable composition of the present invention is not particularly limited. A common method, such as mixing and kneading the above-described components using a mixer, rollers, or a kneader under normal or high temperature or dissolving and mixing the above-described components using a small amount of a suitable solvent, may be employed. These components may be used in combination to prepare a one-component or a two-component composition.

Once exposed to air, the curable resin composition of the present invention forms a three-dimensional network structure and cures into a solid having rubber elasticity due to the presence of water. The curable composition of the present invention is particularly suitable for use in elastic sealants for construction, vessels, automobiles, and road applications. Moreover, since the curable resin composition alone or in combination with a primer can adhere to a wide range of base materials such as glass, ceramic, woods, metals, and molded resin, the curable resin composition of the present invention is applicable to various sealing compositions and adhesive compositions. Examples of adhesive applications include a one-component adhesive, a two-component adhesive, a contact adhesive in which adhesion is completed after open time, and a pressure sensitive adhesive. Moreover, the curable resin composition is suitable for use in paints, membrane-waterproofing agents, food packaging materials, cast rubber materials, molding materials, and foam materials.

BEST MODES FOR CARRYING OUT THE INVENTION

The present invention will now be specifically described by way of nonlimiting examples.

SYNTHETIC EXAMPLE 1

A polyoxypropylene glycol was prepared by polymerizing propylene oxide in the presence of a zinc hexacyanocobaltate glyme complex catalyst using an initiator, i.e., polyoxypropylene glycol having a number-average molecular weight of about 2,000 determined by OH end group analysis. Methanol was then removed by adding 1.2 equivalents of a NaOMe methanol solution relative to the hydroxy groups of this hydroxyγ-terminated polyether oligomer. Subsequently, 3-chloro-1-propene was added to transform the hydroxy groups at the ends into allyl groups. To 500 g of the resulting oligomer, 10 g of hexane was added, and the resulting mixture was dehydrated by azeotropic distillation at 90° C. After removing the hexane under reduced pressure, the oligomer was purged with nitrogen. To the resulting mixture, 30 μl of a platinum-divinyldisiloxane complex (3 wt. % isopropanol solution on a platinum basis) was added, and 9.0 g of dimethoxymethylsilane (DMS) was slowly added dropwise to the resulting mixture with stirring. The resulting mixed solution was allowed to react for 2 hours at 90° C. Unreacting DMS was removed under a reduced pressure to obtain a reactive-silicon-group-containing polyoxypropylene polymer. The $^1$H-NMR analysis of the polymer confirmed that the ratio of introducing reactive silicon groups to the ends was 77% (polymer A). The polystyrene-equivalent number-average molecular weight (Mn) of this polymer determined by GPC was about 15,000 and Mw/Mn was 1.1.

SYNTHETIC EXAMPLE 2

To a nitrogen-purged pressure glass reactor, 450 g of polyoxypropylene glycol having a number-average molecular weight of about 3,000 and 50 g of polyoxypropylene triol having a number-average molecular weight of 3,000 were charged. Methanol was removed from the mixture by adding 0.9 equivalent of a NaOMe methanol solution relative to the end hydroxy groups of this oligomer. To the resulting mixture, 12 g of methylene chloride was added and the mixture was allowed to react at 130° C. The volatile components were removed from the mixture and then methanol was removed from the mixture by adding a NaOMe methanol solution. Subsequently, 15 g of 3-chloro-1-propene was added to transform the end hydroxyl groups to allyl groups. Upon completion of reaction, volatile components were removed under a reduced pressure, and the reaction product was discharged into a beaker. The product was then dissolved in hexane, and the hexane was removed by adsorption using 150 g of aluminum silicate under a reduced pressure. To 500 g of the resulting oligomer, 10 g of hexane was added, and the mixture was dehydrated by azeotropic distillation at 90° C. After removing the hexane under a reduced pressure, the mixture was purged with nitrogen and was then mixed with 30 μl of platinum-divinyldisiloxane complex (3 wt % isopropanol solution on a platinum basis). While the mixture was stirred, 11 g of DMS was slowly added dropwise. After the mixed solution was allowed to react for 2 hours at 80° C., unreacting DMS was removed under a reduced pressure to obtain a reactive-silicon-group-containing polyoxypropylene polymer. The $^1$H-NMR analysis of the polymer confirmed that the ratio of introducing reactive silicon groups to the ends was 72% (polymer B). The polystyrene-equivalent number-average molecular weight (Mn) of this polymer determined by GPC was about 19,000 and Mw/Mn was 1.9.

SYNTHETIC EXAMPLE 3

To prepare a mixture, 2.6 g of a polymerization initiator, i.e., azobis-2-methylbutyronitrile, was added to a solution containing 66 g of methyl methacrylate, 19 g of 2-ethylhexyl acrylate, 5.4 g of γ-methacryloxypropylmethyldimethoxysilane, 7.0 g of γ-mercaptopropylmethyldimethoxysilane, and 23 g of toluene. The liquid mixture was added dropwise to 43 g of toluene, which was heated to 105° C., over 4 hours, and the mixture was allowed to react for two hours to prepare a polymer having a solid content of 60% and a polystyrene-equivalent number-average molecular weight (Mn) of 1,900 determined by GPC (Polymer C).

SYNTHETIC EXAMPLE 4

To prepare a mixture, 2.6 g of a polymerization nitiator, i.e., azobis-2-methylbutyronitrile, was added to a solution containing 72 g of methyl methacrylate, 18 g of 2-ethylhexyl acrylate, 4.0 g of γ-mercaptopropylmethyldimethoxysilane, 4.0 g of normal dodecylmercaptan, and 23 g of toluene. The liquid mixture was added dropwise to 43 g of toluene, which was heated to 105° C., over 4 hours, and the mixture was allowed to react for two hours to prepare a polymer having a solid content of 60% and a polystyrene-equivalent number-average molecular weight (Mn) of 1,600 determined by GPC (Polymer D).

COMPARATIVE SYNTHETIC EXAMPLE 1

To prepare a mixture, 2.6 g of a polymerization initiator, i.e., azobis-2-methylbutyronitrile, was added to a solution containing 72 g of methyl methacrylate, 18 g of stearyl methacrylate, 4.0 g of γ-mercaptopropylmethyldimethoxysilane, 4.0 g of normal dodecylmercaptan, and 23 g of toluene. The liquid mixture was added dropwise to 43 g of toluene, which was heated to 105° C., over 4 hours, and the mixture was allowed to react for two hours to prepare a polymer having a solid content of 60% and a polystyrene-equivalent number-average molecular weight (Mn) of 1,800 determined by GPC (Polymer E).

COMPARATIVE SYNTHETIC EXAMPLE 2

To prepare a mixture, 2.6 g of a polymerization initiator, i.e., azobis-2-methylbutyronitrile, was added to a solution containing 72 g of methyl methacrylate, 18 g of butyl acrylate, 4.0 g of γ-mercaptopropylmethyldimethoxysilane, 4.0 g of normal dodecylmercaptan, and 23 g of toluene. The liquid mixture was added dropwise to 43 g of toluene, which was heated to 105° C., over 4 hours, and the mixture was allowed to react for two hours to prepare a polymer having a solid content of 60% and a polystyrene-equivalent number-average molecular weight (Mn) of 1,600 determined by GPC (Polymer F).

COMPARATIVE SYNTHETIC EXAMPLE 3

To prepare a mixture, 2.6 g of a polymerization initiator, i.e., azobis-2-methylbutyronitrile, was added to a solution containing 66 g of butyl acrylate, 19 g of 2-ethylhexyl acrylate, 5.4 g of γ-methacryloxypropylmethyldimethoxysilane, 7.0 g of γ-mercaptopropylmethyldimethoxysilane, and 23 g of toluene. The liquid mixture was added dropwise to 43 g of toluene, which was heated to 105° C., over 4 hours, and the mixture was allowed to react for two hours to prepare a polymer having a solid content of 60% and a polystyrene-equivalent number-average molecular weight (Mn) of 2,100-determined by GPC (Polymer G).

EXAMPLE 1

The oxyalkylene polymer (Polymer A) prepared in SYNTHETIC EXAMPLE 1 was blended with the copolymer (Polymer C) prepared by SYNTHETIC EXAMPLE 3 at a solid content ratio (weight ratio) of 60/40. The volatile components of the resulting mixture were removed using an evaporator under a reduced pressure at a temperature of 110° C. to obtain a composition having a solid content of 99% or more. The composition was blended with a curing agent, i.e., U-220 manufactured by Nitto Kasei Co., Ltd., and predetermined amounts of a dehydrating agent and an adhesion-inducing agent described in Table 1 to prepare a curable resin composition of the present invention. In Table 1, the content of each component of the composition is described in terms of parts by weight.

EXAMPLE 2

A curable resin composition of the present invention was prepared as in EXAMPLE 1 except that the polymer (Polymer B) prepared in SYNTHETIC EXAMPLE 2 was used as the oxyalkylene polymer.

EXAMPLE 3

A curable resin composition of the present invention was prepared as in EXAMPLE 1 except that the polymer (Polymer D) prepared in SYNTHETIC EXAMPLE 4 was used as the oxyalkylene polymer.

COMPARATIVE EXAMPLES 1 TO 3

The curable resin compositions of COMPARATIVE SYNTHETIC EXAMPLES 1 to 3 were prepared as in EXAMPLE 1 except that the copolymers (Polymers E, F, and G) prepared in COMPARATIVE SYNTHETIC EXAMPLE 1 to 3 were used respectively as the copolymer.

The transparency of the resulting curable resin compositions was visually observed.

Each curable resin composition was formed into a 3-mm sheet, left to stand at 23° C. for three days, and heated at 50° C. for four days to prepare a rubbery sheet. A Japanese Industrial Standards (JIS) #3 dumbbell piece was punched out from the rubbery sheet to determine the tensile properties, the modulus at 100% elongation, the elongation at break, and the strength.

Each curable resin was mixed with a filler, i.e., calcium carbonate (CCR manufactured by Shiraishi Kogyo Kabushiki Kaisha). The amount of the calcium carbonate was 50 parts with respect to a total of 100 parts of the component A and the component B of the present invention. The resulting mixture was applied onto an aluminum plate (A-1050P, a 100×25×2 mm test piece) to form a coating having a thickness of 0.05 mm. The coating was left to stand for 14 days at 23° C. and 50% R.H. to cure the coating. The tensile bond shear strength was then determined.

The ease of handling of the monomers in producing the copolymers were evaluated as follows: "Good" when all monomers were liquid at room temperature and easily mix with each other during production, and "Poor" when some of the monomers were solid at room temperature and required heating to melt the monomers in mixing the monomers.

The results are shown in Table 1.

TABLE 1

|  |  | EX. 1 | EX. 2 | EX. 3 | C. EX. 1 | C. EX. 2 | C. EX. 3 |
|---|---|---|---|---|---|---|---|
| Component A | Polymer A | 60 | — | 60 | 60 | 60 | 60 |
|  | Polymer B | — | 60 | — | — | — | — |
| Component B | Polymer C | 40 | 40 | — | — | — | — |
|  | Polymer D | — | — | 40 | — | — | — |
|  | Polymer E | — | — | — | 40 | — | — |
|  | Polymer F | — | — | — | — | 40 | — |
|  | Polymer G | — | — | — | — | — | 40 |
| Component C *1 |  | 2 | 2 | 2 | 2 | 2 | 2 |
| Dehydrating agent *2 |  | 3 | 3 | 3 | 3 | 3 | 3 |
| Tackifier *3 |  | 2 | 2 | 2 | 2 | 2 | 2 |
| Handling ease of monomers in producing component B |  | Good | Good | Good | Poor | Good | Good |
| Transparency of curable composition |  | Transparent | Transparent | Transparent | Transparent | Phase Separation | Transparent |
| Dumbbell characteristics of cured product | 100% modulus (Mpa) | 0.25 | 0.23 | 0.09 | 0.09 | — | 0.27 |
|  | Elongation at break (%) | 255 | 270 | 780 | 760 | — | 140 |
|  | Strength at break (MPa) | 1.27 | 1.33 | 0.56 | 0.54 | — | 0.36 |
| Tensile bond shear strength (MPa) |  | 7.1 | 6.7 | 5.4 | 4.9 | — | 5.2 |

*1: U-220, dibutyltin diacetylacetonato manufactured by Nitto Kasei Co., Ltd.
*2: A171, vinyltrimethoxysilane manufactured by Nippon Unicar Company Limited.
*3: A1122, γ-(2-aminoethyl)aminopropyltrimethoxysilane manufactured by Nippon Unicar Company Limited.

The properties of the curable composition of COMPARATIVE EXAMPLE 2 were not determined due to the occurrence of phase separation.

Table 1 shows that the curable resin compositions of EXAMPLES 1 to 3 are easy to handle while achieving a transparency comparable or superior to that of COMPARATIVE EXAMPLES 1 and 3. Moreover the mechanical properties and adhesive properties of cured products prepared from the resin compositions of EXAMPLES 1 to 3 are excellent.

INDUSTRIAL APPLICABILITY

A curable resin composition of the present invention is easy to produce since starting materials therefor are easy to handle. The curable resin composition exhibits excellent transparency, and a product prepared from the curable resin composition exhibits excellent mechanical properties and adhesive properties.

The invention claimed is:

1. A curable resin composition comprising:
 (A) an oxyalkylene polymer having silicon-containing functional groups crosslinkable through formation of siloxane bonds;
 (B) a copolymer having silicon-containing functional groups crosslinkable through formation of siloxane bonds, the molecular chain of the copolymer consisting substantially of (b-1) an alkyl (meth)acrylate monomeric unit having $C_1$–$C_2$ alkyl and (b-2) an alkyl (meth)acrylate monomeric unit having -alkyl selected from the group consisting of 2-ethylhexyl, isooctyl and isononyl; and
 (C) a curing agent.

2. The curable resin composition according to claim 1, wherein the molecular chain of the polymer (A) consists substantially of a repeating unit represented by general formula (1):

$$-CH(CH_3)CH_2-O- \qquad (1)$$

3. The curable resin composition according to claim 1 or 2, wherein the number-average molecular weight of the polymer (A) is at least 6,000 and Mw/Mn is 1.6 or less.

4. The curable resin composition according to one of claims 1 to 3, wherein the main chain of the polymer of (A) is synthesized by polymerizing alkylene oxide in the presence of an initiator and at least one catalyst selected from the group consisting of a cyanide complex of compound metal, a cesium compound, and a compound containing a P=N bond.

* * * * *